United States Patent
Adachi et al.

(10) Patent No.: US 9,263,865 B2
(45) Date of Patent: Feb. 16, 2016

(54) WATER STOP STRUCTURE FOR WIRE HARNESS AND WIRE HARNESS

(71) Applicant: Yazaki Corporation, Tokyo (JP)

(72) Inventors: Hideomi Adachi, Kosai (JP); Yoshiaki Ozaki, Kosai (JP)

(73) Assignee: Yazaki Corporation, Tokyo (JP)

( * ) Notice: Subject to any disclaimer, the term of this patent is extended or adjusted under 35 U.S.C. 154(b) by 94 days.

(21) Appl. No.: 14/173,179

(22) Filed: Feb. 5, 2014

(65) Prior Publication Data

US 2014/0151087 A1 Jun. 5, 2014

Related U.S. Application Data

(63) Continuation of application No. PCT/JP2012/070244, filed on Aug. 8, 2012.

(30) Foreign Application Priority Data

Aug. 8, 2011 (JP) .................................. 2011-173164

(51) Int. Cl.
*H02G 3/18* (2006.01)
*H02G 3/04* (2006.01)
(Continued)

(52) U.S. Cl.
CPC .......... *H02G 3/0406* (2013.01); *B60R 16/0222* (2013.01); *H01B 7/2825* (2013.01)

(58) Field of Classification Search
CPC . H02G 3/0406; B60R 16/0222; H01B 7/2825
USPC ..................................................... 174/153 G
See application file for complete search history.

(56) References Cited

U.S. PATENT DOCUMENTS

| 6,438,828 B1 | 8/2002 | Uchiyama |
| 6,442,794 B2 * | 9/2002 | Uchida et al. .................... 16/2.1 |
| 6,963,030 B2 * | 11/2005 | Matsui et al. ................. 174/377 |

(Continued)

FOREIGN PATENT DOCUMENTS

| CN | 1260620 A | 7/2000 |
| CN | 101436736 A | 5/2009 |

(Continued)

OTHER PUBLICATIONS

International Preliminary Report, dated Feb. 11, 2014, issued by the International Searching Authority in counterpart International Application No. PCT/JP2012/070244.

(Continued)

*Primary Examiner* — Dhirubhai R Patel
(74) *Attorney, Agent, or Firm* — Sughrue Mion, PLLC (57) ABSTRACT

A water stop structure for a wire harness includes a cylindrical shield shell which is disposed at an intermediate portion of a shield member in a longitudinal direction, an outer water stop mechanism which is disposed on a side of an outer peripheral surface of the cylindrical shield shell, and an inner water stop mechanism which is disposed on a side of an inner peripheral surface of the cylindrical shield shell. The inner water stop mechanism has an elastic water stop plug member. A shell-side seal portion which is in watertight contact with the inner peripheral surface of the cylindrical shield shell and one or plural conducting path-side seal portions which are in watertight contact with outer peripheral surfaces of covers of the conducting paths are formed on the water stop plug member.

5 Claims, 10 Drawing Sheets

(51) Int. Cl.
*B60R 16/02* (2006.01)
*H01B 7/282* (2006.01)

(56) References Cited

U.S. PATENT DOCUMENTS

| | | |
|---|---|---|
| 2005/0139372 A1 | 6/2005 | Matsui et al. |
| 2009/0130901 A1 | 5/2009 | Aoki et al. |
| 2010/0243321 A1 | 9/2010 | Adachi et al. |
| 2011/0086544 A1 | 4/2011 | Yoshioka et al. |

FOREIGN PATENT DOCUMENTS

| | | |
|---|---|---|
| CN | 101656371 A | 2/2010 |
| CN | 102044796 A | 5/2011 |
| JP | 2005192279 A | 7/2005 |
| JP | 2006140011 A | 6/2006 |
| JP | 2006311699 A | 11/2006 |
| JP | 2009-038882 A | 2/2009 |
| JP | 2010239678 A | 10/2010 |

OTHER PUBLICATIONS

Search Report dated Feb. 9, 2015, issued by the European Patent Office in counterpart European Application No. 12822478.9.
International Search Report, dated Oct. 23, 2012, issued by the International Searching Authority in counterpart International Application No. PCT/JP2012/070244.
Written Opinion, dated Oct. 23, 2012, issued by the International Searching Authority in counterpart International Application No. PCT/JP2012/070244.
Office Action issued Sep. 15, 2015, issued by the Japanese Patent Office in counterpart Japanese Patent Application No. 2011-173164.
Office Action dated Nov. 26, 2015, issued by the State Intellectual Property Office of the People's Republic of China in counterpart Chinese Application No. 201280038890.4.

* cited by examiner

WATER STOP STRUCTURE FOR WIRE HARNESS AND WIRE HARNESS

CROSS REFERENCE TO RELATED APPLICATION

This application is a continuation of PCT application No. PCT/JP2012/070244, which was filed on Aug. 8, 2012 based on Japanese Patent Application (No. 2011-173164) filed on Aug. 8, 2011, the contents of which are incorporated herein by reference. Also, all the references cited herein are incorporated as a whole.

BACKGROUND

1. Technical Field

The present invention relates to a water stop structure for a wire harness, and also to a wire harness employing the water stop structure.

2. Background Art

JP-A-2010-239678 below discloses a technique of a wire harness for electrically connecting a motor of a hybrid automobile or an electric automobile with an inverter. According to the disclosed technique, the wire harness includes: three high-voltage cables (conducting paths), a cylindrical braid (shield member) which collectively covers the three high-voltage cables, a twisted tube (exterior member) which is disposed outside the braid, and a motor-side connecting member and inverter-side connecting member which are disposed in the one and other ends of the three high-voltage cables, respectively.

SUMMARY

The wire harness disclosed in JP-A-2010-239678 is used in a wiring configuration where the motor and the inverter are mounted in a front portion (so-called engine room) of the vehicle, and not used in a wiring configuration where the wire harness penetrates a panel member or the like. Therefore, there is no necessity for providing a water stop structure in conformity with a penetration portion of the panel member or the like.

The place on which a motor and an inverter are to be mounted is not limited to a front portion of a vehicle. Recently, they are sometimes mounted in a rear portion of a vehicle as a rear motor and a rear inverter. Therefore, a wire harness for electrically connecting a rear motor with a rear inverter is sometimes used in a wiring configuration which passes through the vehicle body, and which extends in a cabin and under floor. In such a case, the wire harness must be provided with a water stop structure for preventing water from entering from under the floor, at a position corresponding to the penetration portion of the body.

Here, conventional ideas of a water stop structure will be described with reference to FIGS. 9 and 10. The ideas of a water stop structure have the following problems, and it is seen that there is a room for improvement.

Figure 9:
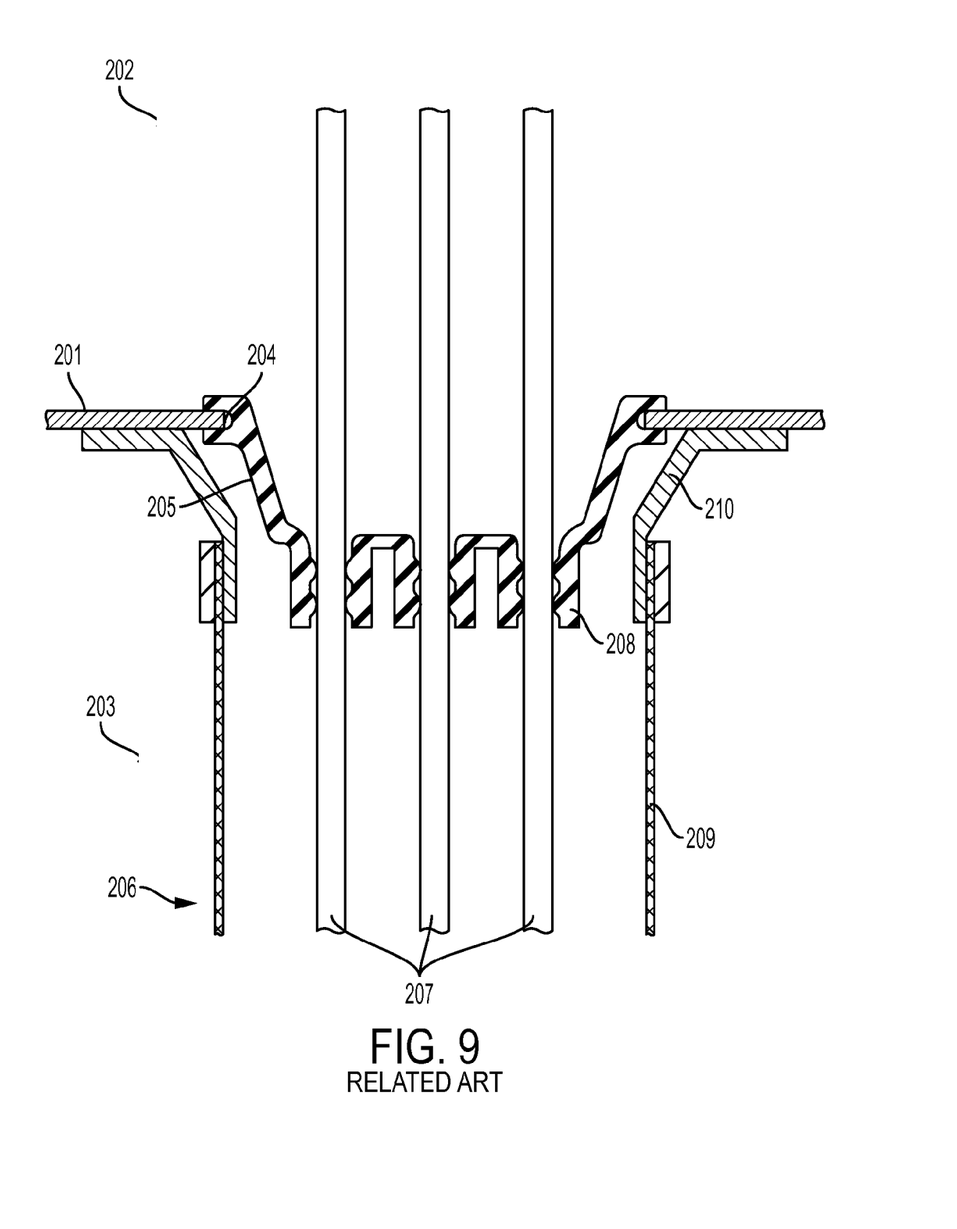
FIG. 9 is a schematic sectional view of a conventional idea of a water stop structure, illustrating a problem.

First, the idea of a water stop structure shown in FIG. 9 has a problem in that, when such a water stop structure is disposed, a shielding function can be exerted only in the under floor side. Hereinafter, the structure will be specifically described.

The reference numeral 201 in FIG. 9 indicates the body of a vehicle. The upper side of the body 201 indicates a cabin 202, and the lower side indicates the under floor 203. A through hole 204 is formed in the body 201. A grommet 205 is disposed in a watertight manner in the through hole 204. Three high-voltage cables 207 constituting a wire harness 206 are passed through cable passing holes 208 of the grommet 205, respectively. The three high-voltage cables 207 are wired in both the cabin 202 and the under floor 203. In the cable passing holes 208, annular lip portions (not referenced) which are in watertight contact with the outer peripheral surfaces of the covers of the high-voltage cables 207 are projectingly formed.

In the above-described configuration and structure, a cylindrical braid 209 which collectively covers the three high-voltage cables 207 cannot extend toward the cabin 202. Therefore, a shield shell 210 is disposed in the terminal of the braid 209. The shield shell 210 is electrically and mechanically connected and fixed to the body 201. Namely, the braid 209 is ground contacted to the body 201 through the shield shell 210.

Therefore, the idea of a water stop structure shown in FIG. 9 has the problem in that, when the water stop structure is disposed, the shielding function can be exerted only on the side of the under floor 203. If the idea of a water stop structure is employed, there arises a problem in that a shield structure configured by another component must be disposed on the side of the cabin 202.

Next, the idea of a water stop structure shown in FIG. 10 will be described. The water stop structure has a problem in that an inspection for checking whether water is surely stopped or not must be performed. Hereinafter, the structure will be specifically described.

Figure 10:
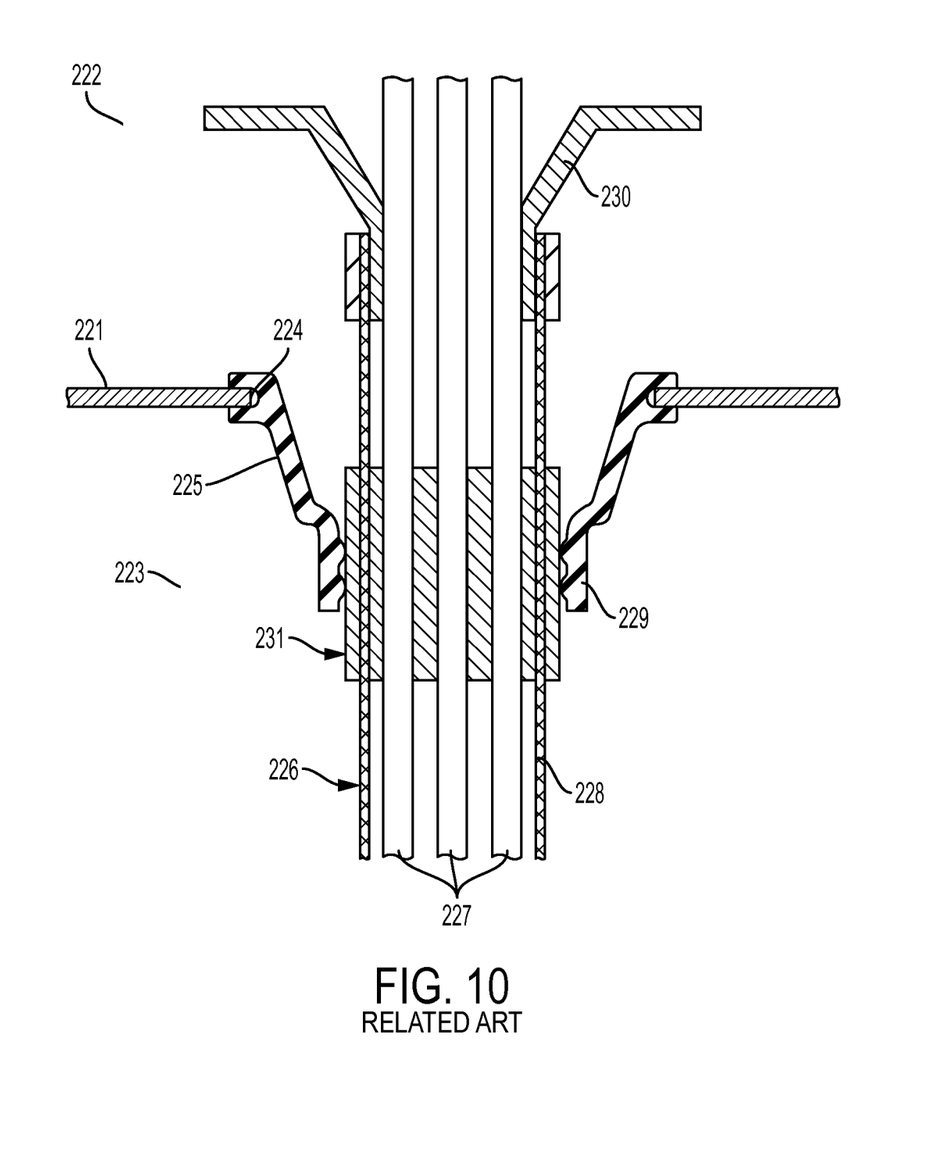
FIG. 10 is a schematic sectional view of another conventional idea of a water stop structure, illustrating a problem.

The reference numeral 221 in FIG. 10 indicates the body of a vehicle. The upper side of the body 221 indicates a cabin 222, and the lower side indicates the under floor 223. A through hole 224 is formed in the body 221. In the through hole 224, a grommet 225 is disposed in a watertight manner. Three high-voltage cables 227 constituting a wire harness 226 are collectively covered by a cylindrical braid 228. The three high-voltage cables 227 and the braid 228 are passed through a cable passing hole 229 of the grommet 225. The three high-voltage cables 227 and the braid 228 are wired in both the cabin 222 and the under floor 223. On the side of the cabin 222, a shield shell 230 is disposed in the terminal of the braid 228, and grounding is performed through the shield shell 230.

The gaps between the three high-voltage cables 227, and the gap between the three high-voltage cables 227 and the braid 228 are sealed by a water-stop material 231. As the water-stop material 231, for example, a structure formed by liquid pouring and sheet roll may be employed. The cable passing hole 229 of the grommet 225 is in contact with the outer peripheral surface of the water-stop material 231.

Unlike the idea of a water stop structure shown in FIG. 9, the idea of a water stop structure shown in FIG. 10 is configured so that a shielding function can be exerted also on the side of the cabin 222. In the idea of a water stop structure shown in FIG. 10, however, the water-stop material 231 formed by liquid pouring and sheet roll is employed. Therefore, the idea has a problem in that an inspection for checking whether water is surely stopped or not must be performed on all products. Such an inspection on all products causes a problem in that the cost is largely increased.

The invention has been conducted in view of the above-discussed circumstances. It is an object of the invention to provide a water stop structure for a wire harness and wire harness in which a shielding function of the wire harness can be sufficiently exerted, and water can be surely stopped, thereby eliminating the necessity of a check inspection.

The problem of the invention can be solved by configurations (1) to (5) below.

(1) A water stop structure for a wire harness comprises: a cylindrical shield shell which is disposed at an intermediate portion of a shield member in a longitudinal direction, the shield member covering one or plural conducting paths, and which is made of an electrically conductive metal, an outer water stop mechanism which is disposed on a side of an outer peripheral surface of the cylindrical shield shell, and an inner water stop mechanism which is disposed on a side of an inner peripheral surface of the cylindrical shield shell, the inner water stop mechanism has an elastic water stop plug member, and, a shell-side seal portion which is in watertight contact with the inner peripheral surface of the cylindrical shield shell and one or plural conducting path-side seal portions which are in watertight contact with outer peripheral surfaces of covers of the conducting paths are formed on the water stop plug member, and the one or plural conducting path-side seal portions are formed so as to pass through the water stop plug member.

According to the water stop structure for a wire harness having the configuration (1) above, the shielding function of the wire harness including one or plural conducting paths, and a shield member covering them is enabled to be sufficiently exerted. Moreover, the water stop structure for a wire harness of (1) above can surely stop water, and eliminate the necessity of an inspection for checking whether water is stopped or not. Namely, the water stop structure for a wire harness of (1) includes the cylindrical shield shell which is disposed in the intermediate portion of the shield member in the longitudinal direction, and the cylindrical shield shell is made electrically conductive. In the water stop structure for a wire harness of (1), therefore, the shielding function of a wire harness is not impaired. Even when the water stop structure is disposed, as a result, the shielding function can be sufficiently exerted.

Furthermore, the water stop structure for a wire harness having the configuration (1) above includes the outer water stop mechanism and inner water stop mechanism which are disposed on the sides of the outer and inner peripheral surfaces of the cylindrical shield shell, and therefore can surely stop water and eliminate the necessity of a check inspection. Specifically, the inner water stop mechanism has the elastic water stop plug member, and the shell-side seal portion is formed in the water stop plug member. Therefore, the water stop plug member can be in watertight contact with the inner peripheral surface of the cylindrical shield shell. Moreover, also the conducting path-side seal portions are formed in the water stop plug member. Therefore, the water stop plug member can be in watertight contact with the outer peripheral surfaces of the covers of the conducting paths. Consequently, the water stop structure for a wire harness having the configuration (1) can surely stop water, and hence eliminate the necessity of an inspection for checking whether water is surely stopped or not.

(2) In the water stop structure for a wire harness having the configuration (1) above, the inner water stop mechanism includes a slip-off preventing mechanism which prevents the water stop plug member from slipping off the cylindrical shield shell.

According to the water stop structure for a wire harness having the configuration (2) above, the inner water stop mechanism includes the slip-off preventing mechanism, and therefore the water stop plug member can be prevented from slipping off the cylindrical shield shell. According to the configuration, the water stop state can be maintained while holding sureness.

(3) In the water stop structure for a wire harness having the configuration (1) or (2) above, the outer water stop mechanism includes a seal portion which is formed on the outer peripheral surface of the cylindrical shield shell and a grommet which is provided so as to be in watertight contact with the seal portion.

According to the water stop structure for a wire harness having the configuration (3) above, the outer water stop mechanism includes the seal portion and the grommet, the seal portion is formed on the outer peripheral surface of the cylindrical shield shell, and the grommet is disposed in a watertight manner in the seal portion. Therefore, also the outer peripheral surface of the cylindrical shield shell can surely stop water. Consequently, it is possible to eliminate the necessity of an inspection for checking whether water is surely stopped or not.

(4) In the water stop structure for a wire harness having the configuration (1) or (2) above, the outer water stop mechanism includes a flange-like metal shell which is formed projectingly from the outer peripheral surface of the cylindrical shield shell and a seal member which is provided so as to be in watertight contact with the flange-like metal shell.

According to the water stop structure for a wire harness having the configuration (4) above, the outer water stop mechanism includes the flange-like metal shell and the seal member, the flange-like metal shell is projectingly formed on the outer peripheral surface of the cylindrical shield shell, and the seal member is disposed in a watertight manner in the flange-like metal shell. Therefore, also the outer peripheral surface of the cylindrical shield shell can surely stop water. Consequently, it is possible to eliminate the necessity of an inspection for checking whether water is surely stopped or not.

(5) A wire harness wherein the water stop structure for the wire harness having the configuration (1) or (2) above is disposed in a penetration portion in a vehicle.

(6) A wire harness wherein the water stop structure for a wire harness having the configuration (3) above is disposed in a penetration portion in a vehicle.

(7) A wire harness wherein the water stop structure for a wire harness having the configuration (4) above is disposed in a penetration portion in a vehicle.

According to the wire harnesses having the configurations (5) to (7) above, the water stop structure for a wire harness having any one of the configurations (1) to (4) above is placed in a penetration portion in a vehicle. Therefore, the shielding function is not impaired while setting the penetration portion as the boundary, and water can be surely stopped.

According to the water stop structure for a wire harness having the configuration (1) above, the shielding function of the wire harness is enabled to be sufficiently exerted, and water can be surely stopped, thereby eliminating the necessity of a check inspection. When the necessity of an inspection for checking whether water is surely stopped or not is eliminated, it is possible to suppress increase of the cost.

According to the water stop structure for a wire harness having the configuration (2) above, the water stop state can be maintained while holding sureness. According to the water stop structure for a wire harness having the configuration (3) or (4) above, moreover, water can be stopped more surely, and it is possible to eliminate the necessity of a check inspection.

According to the wire harness having the configurations (5) to (7) above, it is possible to provide a wire harness in which the shielding function can be sufficiently exerted, and the necessity of an inspection for checking whether water is surely stopped or not can be eliminated.

DETAILED DESCRIPTION OF THE EXEMPLARY EMBODIMENTS

In a wiring configuration of a water stop structure for a wire harness of an embodiment of the invention, the water stop structure includes:

a cylindrical shield shell which is disposed at an intermediate portion of a shield member in a longitudinal direction, the shield member covering one or plural conducting paths, and which is made of an electrically conductive metal;

an outer water stop mechanism which is disposed on a side of an outer peripheral surface of the cylindrical shield shell; and an inner water stop mechanism which is disposed on a side of an inner peripheral surface of the cylindrical shield shell, wherein the inner water stop mechanism has an elastic water stop plug member; and wherein a shell-side seal portion which is in watertight contact with the inner peripheral surface of the cylindrical shield shell and one or plural conducting path-side seal portions which are in watertight contact with outer peripheral surfaces of covers of the conducting paths are formed on the water stop plug member, the one or plural conducting path-side seal portions being formed so as to pass through the water stop plug member.

Embodiment 1

Figure 1A:
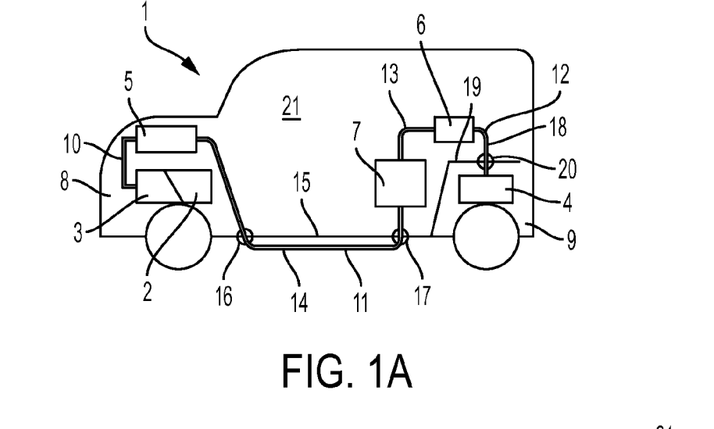
FIG. 1A is a diagram showing a wiring configuration of a wire harness of an embodiment of the invention.
Figure 1B:
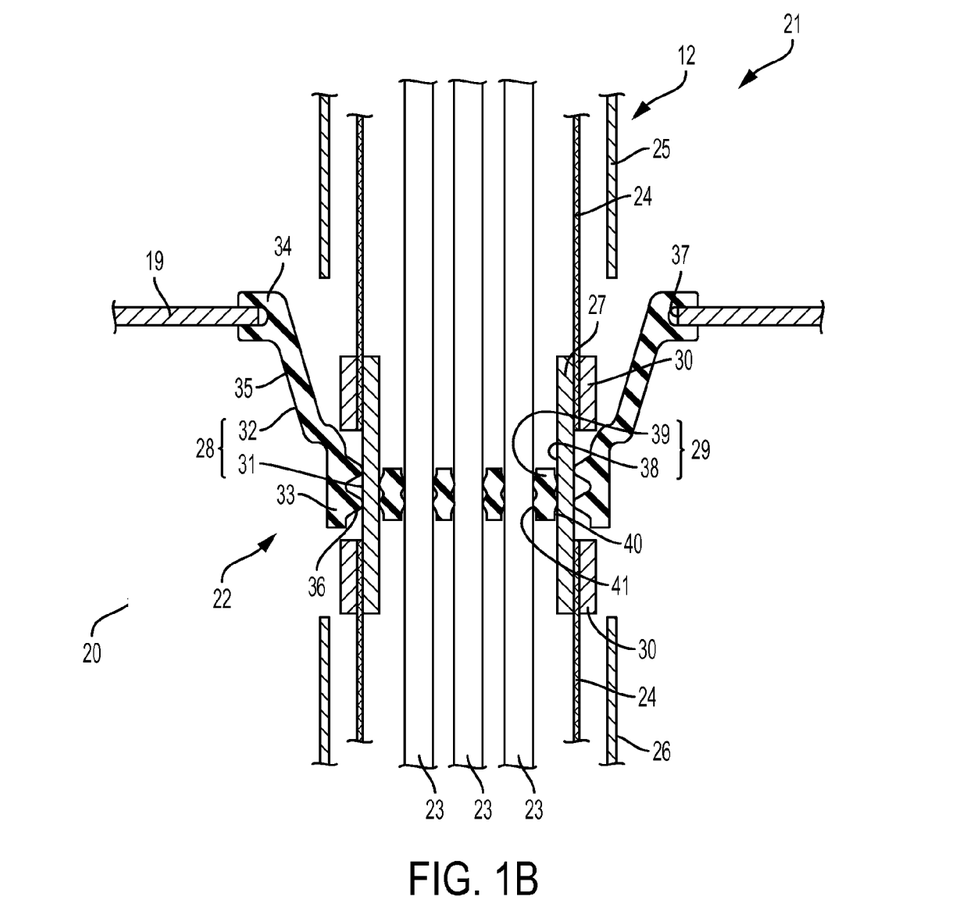
FIG. 1B is a schematic sectional view of a water stop structure for a wire harness of Embodiment 1 of the invention.

Hereinafter, a water stop structure for a wire harness, and wire harness of Embodiment 1 of the invention will be described with reference to the drawings. FIGS. 1A and 1B are diagrams of the water stop structure for a wire harness, and wire harness of Embodiment 1 of the invention.

In embodiments of the application, description will be made with exemplifying the case where a water stop structure for a wire harness, and wire harness of an embodiment of the invention are employed in a hybrid automobile (or an electric automobile).

In FIG. 1A, a hybrid automobile 1 is a vehicle which is driven by using in combination an engine 2, a front motor unit 3, and a rear motor unit 4. The vehicle is configured so that the power of a battery 7 (battery pack, assembled battery) is supplied to the front motor unit 3 via a front inverter unit 5, and to the rear motor unit 4 via a rear inverter unit 6. In the embodiment, the engine 2, the front motor unit 3, and the front inverter unit 5 are mounted in an engine room 8 located in a position where the front wheels and the like are situated. The rear motor unit 4, the rear inverter unit 6, and the battery 7 are mounted in an automobile rear portion 9 where the rear wheels and the like are situated (the mounting positions are examples. The battery 7 is not particularly limited as far as it can be used in the hybrid automobile 1, an electric automobile, or the like).

The front motor unit 3 and the front inverter unit 5 are connected to each other by a high-voltage wire harness 10. The front inverter unit 5 and the battery 7 are connected to each other by a high-voltage wire harness 11. Furthermore, the rear motor unit 4 and the rear inverter unit 6 are connected to each other by a high-voltage wire harness 12. The rear inverter unit 6 and the battery 7 are connected to each other by a high-voltage wire harness 13.

An intermediate portion 14 of the wire harness 11 is wired on the ground side of a vehicle body floor 15. The wire harness 11 is wired along and in substantially parallel to the vehicle body floor 15. The vehicle body floor 15 is a known body component, and a so-called panel member. In the vehicle body floor, through holes (not referenced) are formed at predetermined positions. The through holes function as pass through portions for the wire harness 11. It is assumed that portions where the through holes functioning as pass through portions for the wire harness 11 are formed correspond to penetration portions 16, 17 in the embodiment.

The wire harness 12 is wired so that its intermediate portion 18 penetrates a vehicle body floor 19 in the automobile rear portion 9. It is assumed that a portion where a through hole (described later) through which the wire harness 12 is passed corresponds to a penetration portion 20 in the embodiment.

The wire harness 11 and the wire harness 12 are wired in both the vehicle body floor 15 (19) and a cabin 21. Therefore, a water stop structure (water stop structure for a wire harness) for preventing water from entering the cabin 21 is necessary.

With respect to Embodiment 1, hereinafter, description will be made on the wire harness 12, and a water stop structure 22 which is a water stop structure for a wire harness that is disposed on the wire harness 12 in conformity with the position of the penetration portion 20. Water stop structures 22 may be disposed in the wire harness 11 in conformity with the positions of the penetration portions 16, 17.

Referring to FIG. 1B, the wire harness 12 includes: three high-voltage wires 23 (conducting paths), an electromagnetic shield member 24 (shield member) which collectively covers the three high-voltage wires 23 to shield them, exterior members 25, 26 which are disposed outside the electromagnetic shield member 24, motor-side connecting portions (not shown) which are disposed in one ends of the three high-voltage wires 23, respectively, and inverter-side connecting portions (not shown) which are disposed in the other ends of the three high-voltage wires 23, respectively.

The high-voltage wires 23 are high-voltage conducting paths including a conductor and an insulator (sheath), and formed so as to have a length required for electrical connection. The conductors are produced by copper, a copper alloy, aluminum, or an aluminum alloy. The conductors may have any of a conductor structure configured by stranding element wires, and a bar conductor structure having a rectangular or circular sectional shape (for example, a conductor structure having a rectangular single core or a round single core, and, in this case, the wire itself has a bar-like shape).

In the embodiment, the high-voltage wires 23 are used, but it is not limited thereto. That is, it is possible to use wires in which an insulator is disposed on a known bus bar so as to form a high-voltage conducting path, or the like.

The electromagnetic shield member 24 is a cylindrical member for electromagnetic shield (member shielding against electromagnetic waves) which covers the total length of the three high-voltage wires 23. In the embodiment, a braid configured by knitting many very thin element wires which are electrically conductive is used in the member. The electromagnetic shield member 24 is connected to the motor-side connecting portions and inverter-side connecting portions which are not shown, and connected to a shield case or the like (not shown) through these portions.

The electromagnetic shield member 24 may be formed into a cylindrical shape by using a metallic foil and a resin layer, or only a metallic foil (the member is not particularly limited as far as countermeasures against electromagnetic waves are enabled, and the water stop structure 22 which will be described later can be disposed).

The exterior members 25, 26 are members for covering and protecting the three high-voltage wires 23 and the electromagnetic shield member 24. Corrugated tubes, twisted tubes, or the like are used as the members. The exterior member 25 is disposed on the side of the cabin 21, and the exterior member 26 is disposed on the ground side of the vehicle body floor 19. The exterior members 25, 26 are disposed in portions of the high-voltage wires 23 and the electromagnetic shield member 24 which need protection.

In the embodiment, the motor-side connecting portions and inverter-side connecting portions which are not shown are configured as a known shield connector. Specifically, each of the motor-side connecting portions and the inverter-side connecting portions includes: a terminal fitting connected to the conductor of the high-voltage wire 23, a connector housing which houses and holds the terminal fitting, a rubber plug which is disposed on the insulator of the high-voltage wire 23, and in watertight contact with the connector housing, and a shield shell which is disposed outside the connector housing, and which is connected to a shield case of the rear motor unit 4 or the rear inverter unit 6.

The water stop structure 22 in Embodiment 1 is disposed in the wire harness 12 in conformity with the position of the penetration portion 20 as described above. The water stop structure 22 includes a cylindrical shield shell 27 which is disposed at an intermediate portion of the electromagnetic shield member 24 in a longitudinal direction thereof, an outer water stop mechanism 28 which is disposed on the side of the outer peripheral surface of the cylindrical shield shell 27, and an inner water stop mechanism 29 which is disposed on the side of the inner peripheral surface of the cylindrical shield shell 27.

The cylindrical shield shell 27 is a member made of an electrically conductive metal, and formed into a cylindrical shape. The cylindrical shield shell 27 is formed as a member which can divide the intermediate portion of the electromagnetic shield member 24 in the longitudinal direction, and join together the divided portions. In Embodiment 1, when the intermediate divided portions of the electromagnetic shield member 24 are to be joined together, shield rings 30 are used.

In a specific example of using the shield rings 30, the intermediate divided portions of the electromagnetic shield member 24 are placed on an one-end outer peripheral surface and other-end outer peripheral surface of the cylindrical shield shell 27, respectively, and then the shield rings 30 are placed outside the intermediate divided portions. Thereafter, the shield rings 30 are crimped, thereby joining the intermediate divided portions of the electromagnetic shield member 24 to the cylindrical shield shell 27.

A seal portion 31 is formed on the intermediate outer peripheral surface of the cylindrical shield shell 27. The seal portion 31 is formed as a portion with which a grommet 32 constituting the outer water stop mechanism 28 is in watertight contact. The seal portion 31 and the grommet 32 are disposed as a portion and member which constitute the outer water stop mechanism 28.

The grommet 32 is a known elastic rubber member, and has a wire harness-side seal portion 33, a through hole-side seal portion 34, and a connecting portion 35 which joins these portions together. The portions are formed into an annular or cylindrical shape. In the wire harness-side seal portion 33, a plurality of lip portions 36 which are in watertight contact with the seal portion 31 of the cylindrical shield shell 27 are formed. The through hole-side seal portion 34 is formed so as to be fitted in a watertight manner to the inner and outer rims of a through hole 37 which penetrates the vehicle body floor 19.

The outer water stop mechanism 28 is configured so that entering of water from the side of the outer peripheral surface of the cylindrical shield shell 27 into the cabin 21 can be prevented from occurring by disposing the seal portion 31 and the grommet 32.

In contrast to the outer water stop mechanism 28 configured as described above, the inner water stop mechanism 29 is configured so that entering of water from the side of the inner peripheral surface of the cylindrical shield shell 27 can be prevented from occurring. Specifically, the inner water stop mechanism has: a seal portion 38 which is formed on the intermediate inner peripheral surface of the cylindrical shield shell 27, and a water stop plug member 39 which is in watertight contact with the outer peripheral surfaces of the covers of the three high-voltage wires 23 passed through the cylindrical shield shell 27, and also with the seal portion 38, and is configured so that entering of water can be prevented from occurring.

In Embodiment 1, as the water stop plug member 39, an elastic rubber plug is used. The water stop plug member 39 has a shell-side seal portion 40 which is in watertight contact with the seal portion 38, and conducting path-side seal portions 41 which are formed while passing through the water stop plug member 39.

The shell-side seal portion 40 of the water stop plug member 39 is formed into a lip-like shape configured by a plurality of lip portions (not referenced).

In the water stop plug member 39, since the number of the high-voltage wires 23 is three, three conducting path-side seal portions 41 are formed (the portions are penetratingly formed in conformity with the number of the conducting paths). Similarly with the shell-side seal portion 40, the conducting path-side seal portions 41 are formed into a lip-like shape configured by a plurality of lip portions (not referenced).

In the above-described configuration and structure of Embodiment 1, the water stop structure 22 includes the cylindrical shield shell 27 which is disposed in an intermediate portion of the electromagnetic shield member 24 constituting the wire harness 12 in the longitudinal direction, the cylindrical shield shell 27 is made electrically conductive, and therefore the shielding function of the wire harness 12 is not impaired. As a result, the configuration attains an effect that, even when the water stop structure 22 is disposed, the shielding function can be sufficiently exerted.

Furthermore, the water stop structure 22 includes the outer water stop mechanism 28 and inner water stop mechanism 29 which are disposed on the sides of the outer and inner peripheral surfaces of the cylindrical shield shell 27. Because of the above-described configurations and structures of the outer water stop mechanism 28 and the inner water stop mechanism 29, an effect that water is surely stopped is attained. When water can be surely stopped, another effect that the necessity of an inspection for checking whether water stop is sufficiently performed or not can be eliminated is attained. Therefore, also a further effect that the necessity of a check inspection can be eliminated, and it is possible to suppress increase of the cost is attained.

Embodiment 2

Figure 2:
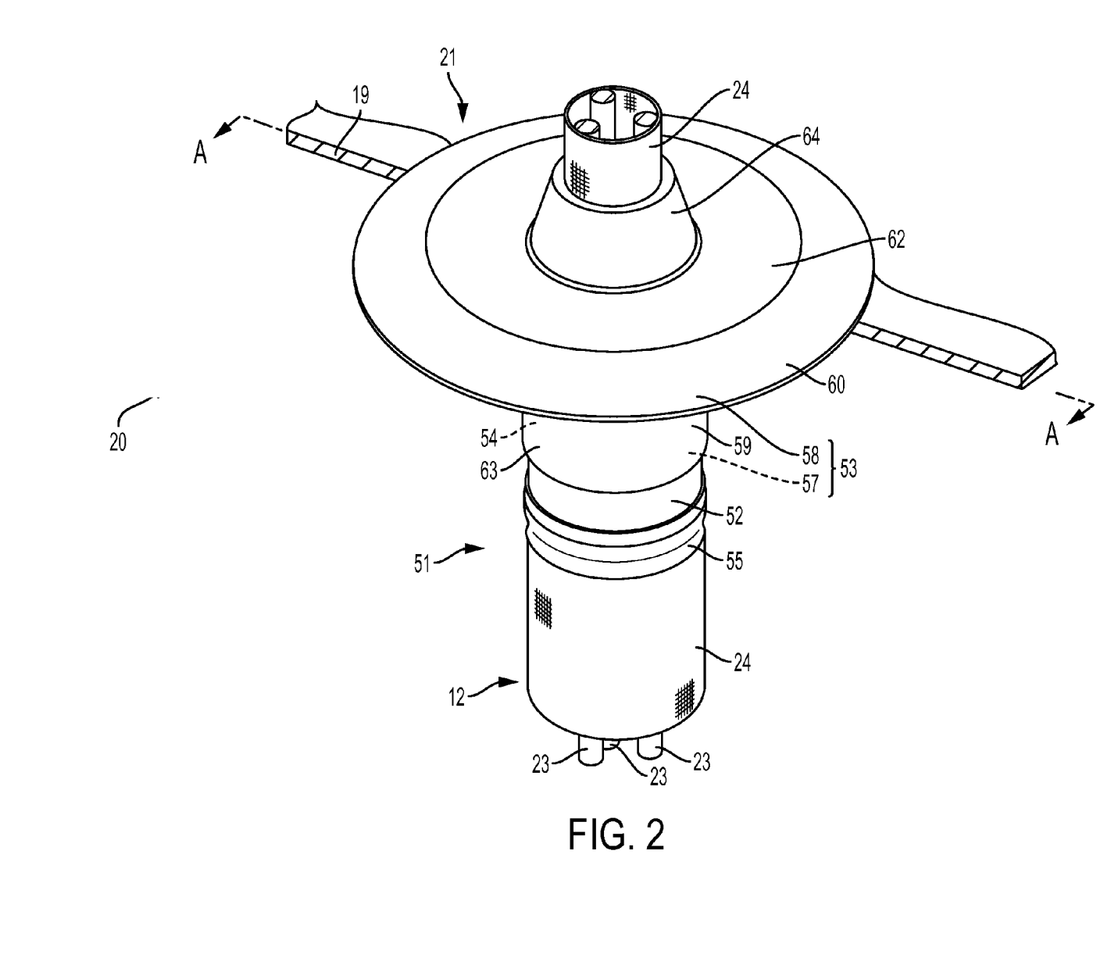
FIG. 2 is a perspective view of a water stop structure for a wire harness, and wire harness of Embodiment 2 of the invention.
Figure 3:
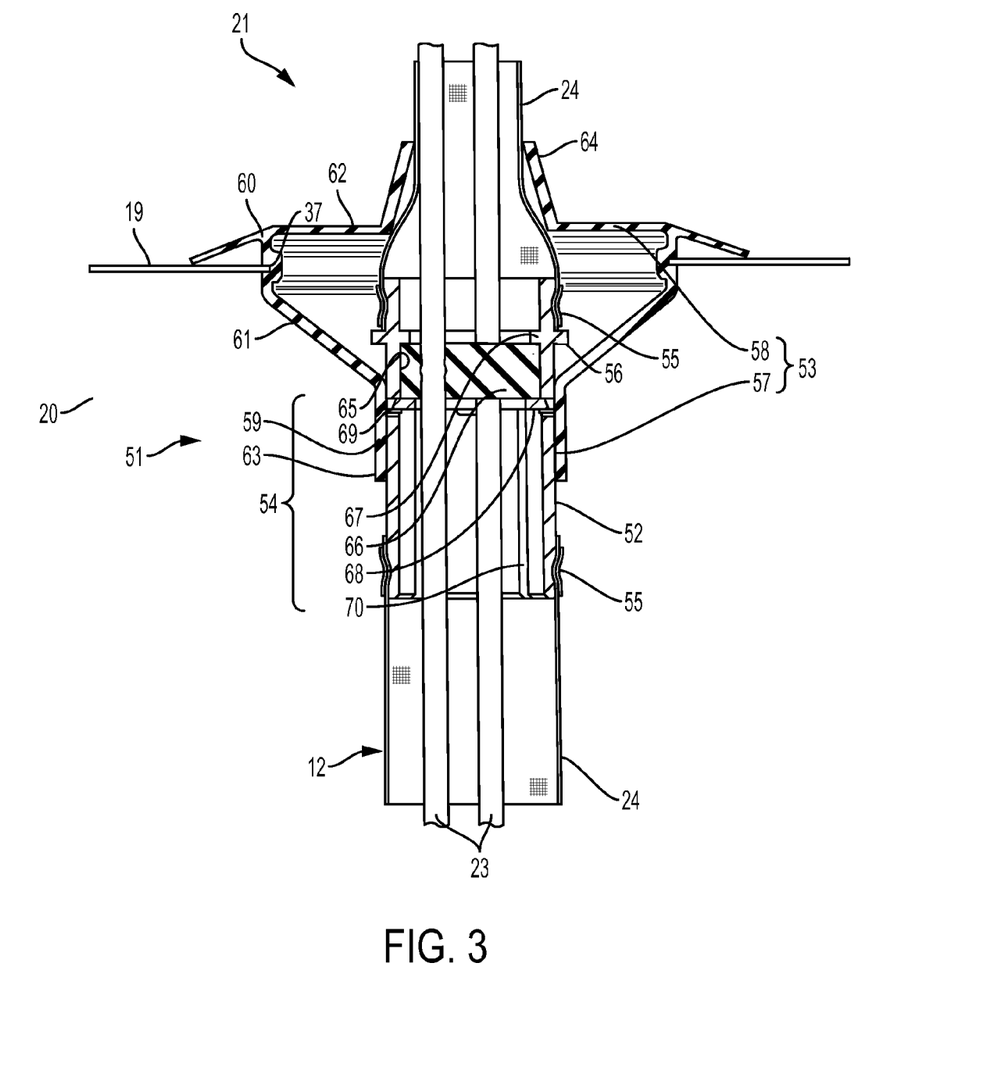
FIG. 3 is a sectional view taken along line A-A in FIG. 2.
Figure 4:
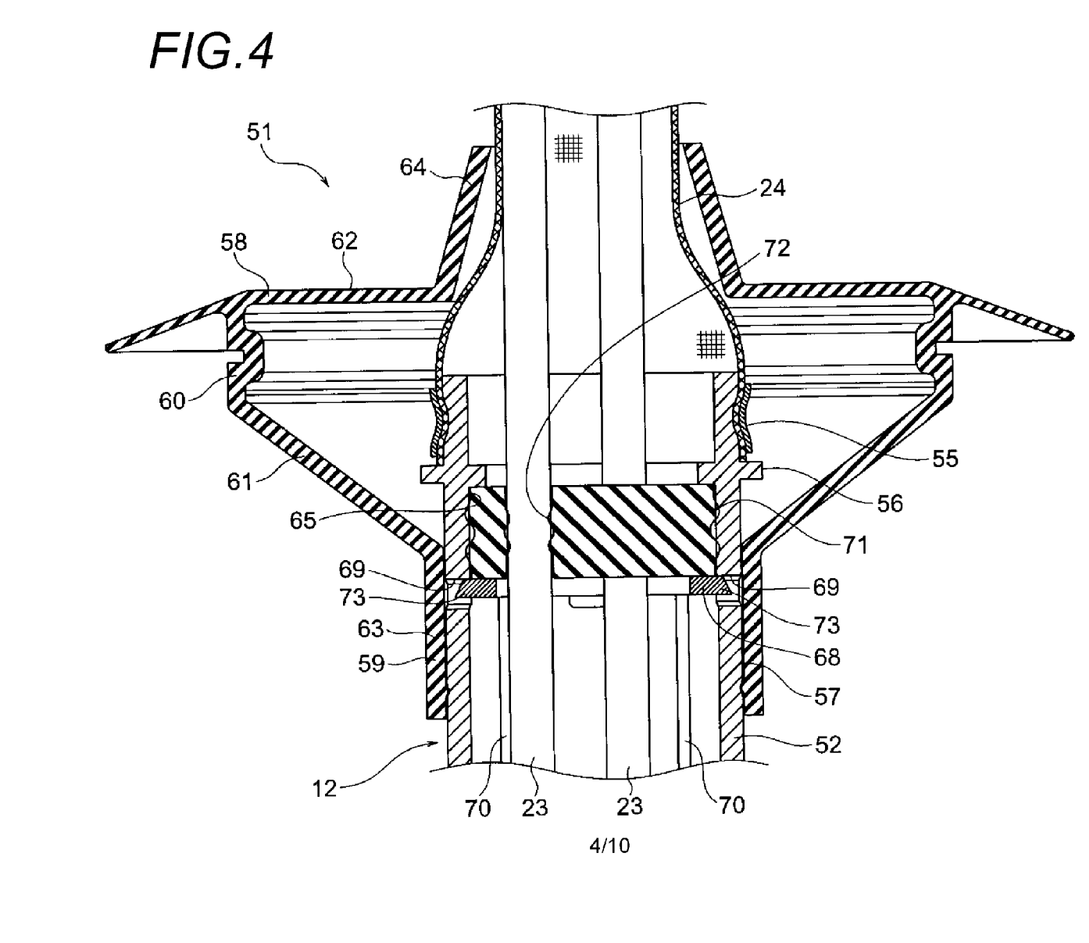
FIG. 4 is an enlarged view of main portions of FIG. 3.

Hereinafter, a water stop structure for a wire harness, and wire harness of Embodiment 2 of the invention will be described with reference to the drawings. FIG. 2 is a perspective view of the water stop structure for a wire harness, and wire harness of Embodiment 2 of the invention. FIG. 3 is a sectional view taken along line A-A in FIG. 2. FIG. 4 is an enlarged view of main portions of FIG. 3. The components which are identical with those of Embodiment 1 are denoted by the same reference numerals, and their detailed description is omitted.

In FIG. 2, the reference numeral 51 indicates a water stop structure (water stop structure for a wire harness) which attains similar effects as the water stop structure 22 (see FIG. 1) of Embodiment 1. The water stop structure 51 of Embodiment 2 is disposed on the wire harness 12 in conformity with the position of the penetration portion 20 (see FIG. 3) of the vehicle body floor 19.

Referring to FIGS. 2 to 4, the water stop structure 51 includes: a cylindrical shield shell 52 which is disposed in an intermediate portion of the electromagnetic shield member 24 in the longitudinal direction, an outer water stop mechanism 53 which is disposed on the side of the outer peripheral surface of the cylindrical shield shell 52, and an inner water stop mechanism 54 which is disposed on the side of the inner peripheral surface of the cylindrical shield shell 52. With respect to the wire harness 12, the illustration of the exterior members 25, 26 (see FIG. 1) will be omitted.

The cylindrical shield shell 52 is a member made of an electrically conductive metal, and formed into a cylindrical shape. The cylindrical shield shell 52 is formed as a member which can divide the intermediate portion of the electromagnetic shield member 24 in the longitudinal direction, and join together the divided portions. In Embodiment 2, when the intermediate divided portions of the electromagnetic shield member 24 are to be joined together, shield rings 55 are used.

In a specific example of using the shield rings 55, similarly with Embodiment 1, the intermediate divided portions of the electromagnetic shield member 24 are placed on an one-end outer peripheral surface and other-end outer peripheral surface of the cylindrical shield shell 52, respectively, and then the shield rings 55 are placed outside the intermediate divided portions. Thereafter, the shield rings 55 are crimped, thereby joining the intermediate divided portions of the electromagnetic shield member 24 to the cylindrical shield shell 52.

An annular flange portion 56 is projectingly formed in the boundary portion between the one-end outer peripheral surface and intermediate outer peripheral surface of the cylindrical shield shell 52. The flange portion 56 is formed as a receiving portion.

A seal portion 57 is formed on the intermediate outer peripheral surface of the cylindrical shield shell 52. The seal portion 57 is formed as a portion with which a grommet 58 constituting the outer water stop mechanism 53 is in watertight contact. The seal portion 57 and the grommet 58 are disposed as a portion and member which constitute the outer water stop mechanism 53.

The grommet 58 is a known elastic rubber member, and has a wire harness-side seal portion 59, a through hole-side seal portion 60, a connecting portion 61 which joins these portions together, and a cabin-side extending portion 62. The wire harness-side seal portion 59, the through hole-side seal portion 60, and the connecting portion 61 are formed into an annular or cylindrical shape. The cabin-side extending portion 62 is formed into an approximately lid-like shape.

In the wire harness-side seal portion 59, a plurality of lip portions (not referenced) which are in watertight contact with the seal portion 57 of the cylindrical shield shell 52 are formed. Also, a cylindrical cover portion 63 which covers an engagement hole 69 that will be described later is formed. The through hole-side seal portion 60 is formed so as to be fitted in a watertight manner to the inner and outer rims of the through hole 37 which penetrates the vehicle body floor 19. The cabin-side extending portion 62 is disposed on the side of the cabin 21. In the thus configured cabin-side extending portion 62, a shield member holding portion 64 having a substantially cylindrical shape which causes the electromagnetic shield member 24 to shrink toward the three high-voltage wires 23 is formed.

The outer water stop mechanism 53 is configured so that entering of water from the side of the outer peripheral surface of the cylindrical shield shell 52 into the cabin 21 can be prevented from occurring by disposing the seal portion 57 and the grommet 58.

In contrast to the outer water stop mechanism 53 configured as described above, the inner water stop mechanism 54 is configured so that entering of water from the side of the inner peripheral surface of the cylindrical shield shell 52 can be prevented from occurring. Specifically, the inner water stop mechanism has: a seal portion 65 which is formed on the intermediate inner peripheral surface of the cylindrical shield shell 52, a water stop plug member 66 which is in watertight contact with the outer peripheral surfaces of the covers of the three high-voltage wires 23 passed through the cylindrical shield shell 52, and also with the seal portion 65, an annular flange portion 67 which locates and receives the water stop plug member 66, an annular slip-off preventing member 68 which prevents the water stop plug member 66 from slipping off, the engagement hole 69 which engages with the slip-off preventing member 68 to latch it, and a guiding groove 70, and is configured so that entering of water can be prevented from occurring.

The water stop plug member 66 is basically identical with the water stop plug member 39 (see FIG. 1) in Embodiment 1, and an elastic rubber plug is used. The water stop plug member 66 has a shell-side seal portion 71 which is in watertight contact with the seal portion 65, and conducting path-side seal portions 72 which are formed while passing through the water stop plug member 66.

The shell-side seal portion 71 of the water stop plug member 66 is formed into a lip-like shape configured by a plurality of lip portions (not referenced) (for the sake of convenience, the lip portions in the figure show a state before collapsing).

In the water stop plug member 66, since the number of the high-voltage wires 23 is three, three conducting path-side seal portions 66 are formed (the portions are penetratingly formed in conformity with the number of the conducting paths). Similarly with the shell-side seal portion 71, the conducting path-side seal portions 72 are formed into a lip-like shape configured by a plurality of lip portions (not referenced).

The slip-off preventing member 68 is disposed as an annular component. A plurality of engagement claws 73, and one or plural guiding projections (not shown) are formed in the outer peripheral edge of the slip-off preventing member 68. The engagement claws 73 are formed as a portion which engages with the engagement hole 69 to be latched. The guiding projections which are not shown are formed as a portion which is guided by the guiding groove 70 formed in the inner peripheral surface of the cylindrical shield shell 52. The portion between the outer and inner rims of the slip-off preventing member 68 is formed as a portion which presses the water stop plug member 66.

The annular flange portion 67, the slip-off preventing member 68, the engagement hole 69, and the guiding groove 70 correspond to the slip-off preventing mechanism in the embodiment.

In the above-described configuration and structure of Embodiment 2, the water stop structure 51 includes the cylindrical shield shell 52 which is disposed in an intermediate portion of the electromagnetic shield member 24 constituting the wire harness 12 in an longitudinal direction, and the cylindrical shield shell 52 is made electrically conductive, therefore the shielding function of the wire harness 12 is not impaired. As a result, the configuration attains an effect that, even when the water stop structure 51 is disposed, the shielding function can be sufficiently exerted.

Furthermore, the water stop structure 51 includes the outer water stop mechanism 53 and inner water stop mechanism 54 which are disposed on the sides of the outer and inner peripheral surfaces of the cylindrical shield shell 52. Because of the above-described configurations and structures of the outer water stop mechanism 53 and the inner water stop mechanism 54, an effect that water is surely stopped is attained. When water can be surely stopped, another effect that the necessity of an inspection for checking whether water stop is sufficiently performed or not can be eliminated is attained. Therefore, also a further effect that the necessity of a check inspection can be eliminated, and it is possible to suppress increase of the cost is attained.

Embodiment 3

Figure 5:
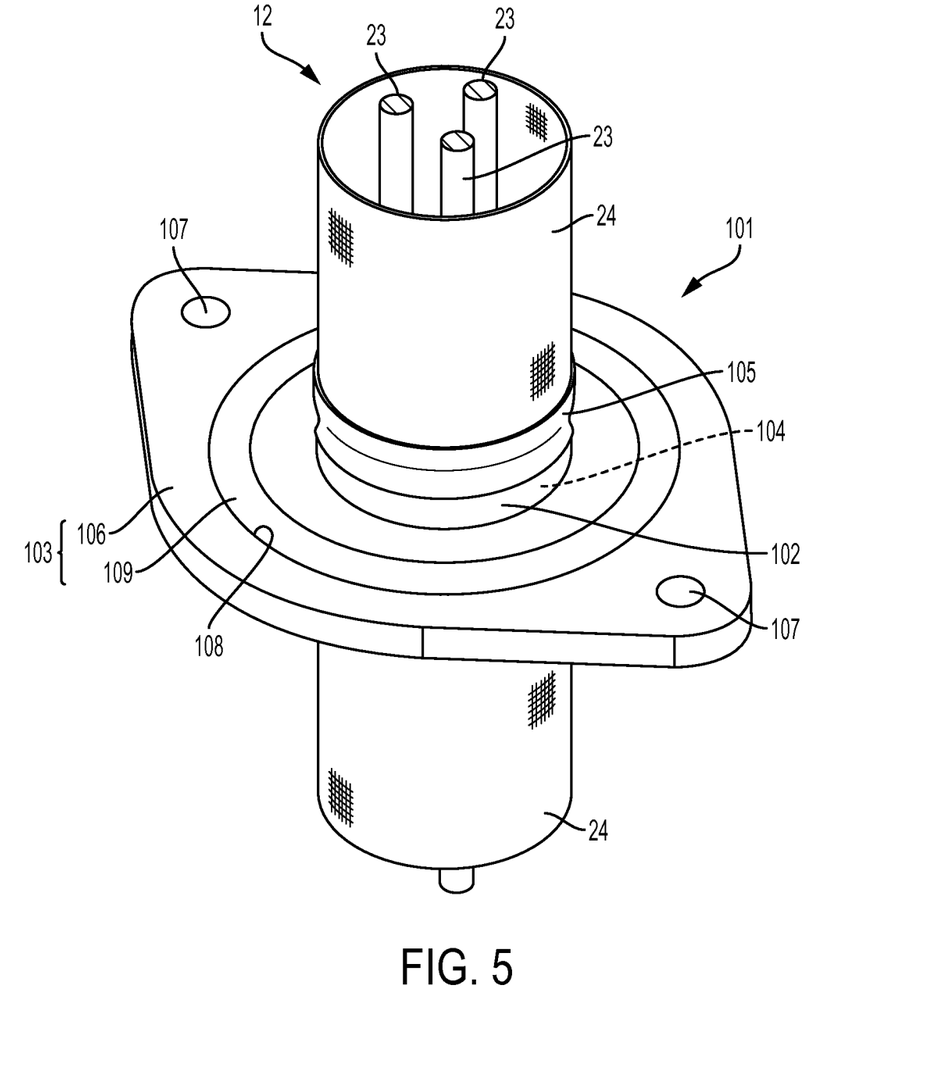
FIG. 5 is a perspective view of a water stop structure for a wire harness, and wire harness of Embodiment 3 of the invention.
Figure 6:
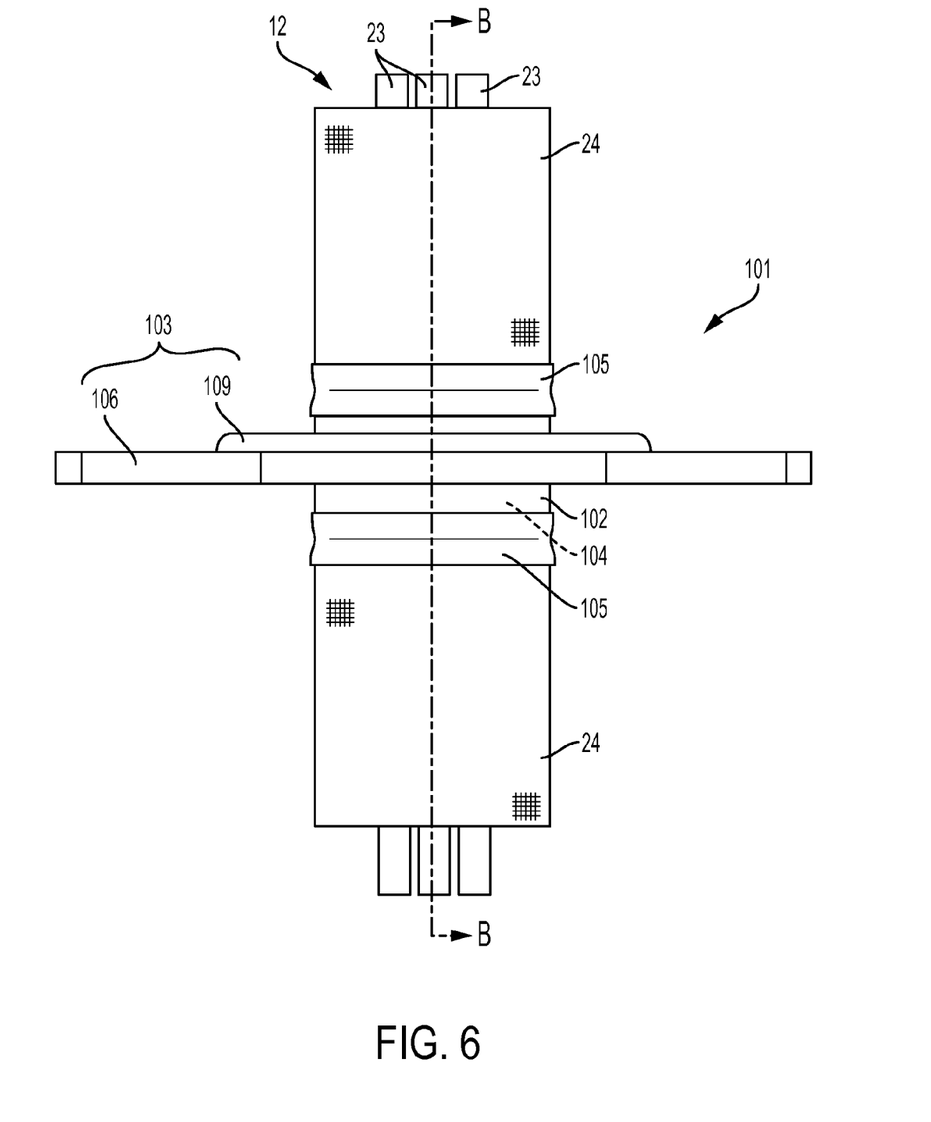
FIG. 6 is a front view of the water stop structure for a wire harness shown in FIG. 5.
Figure 7:
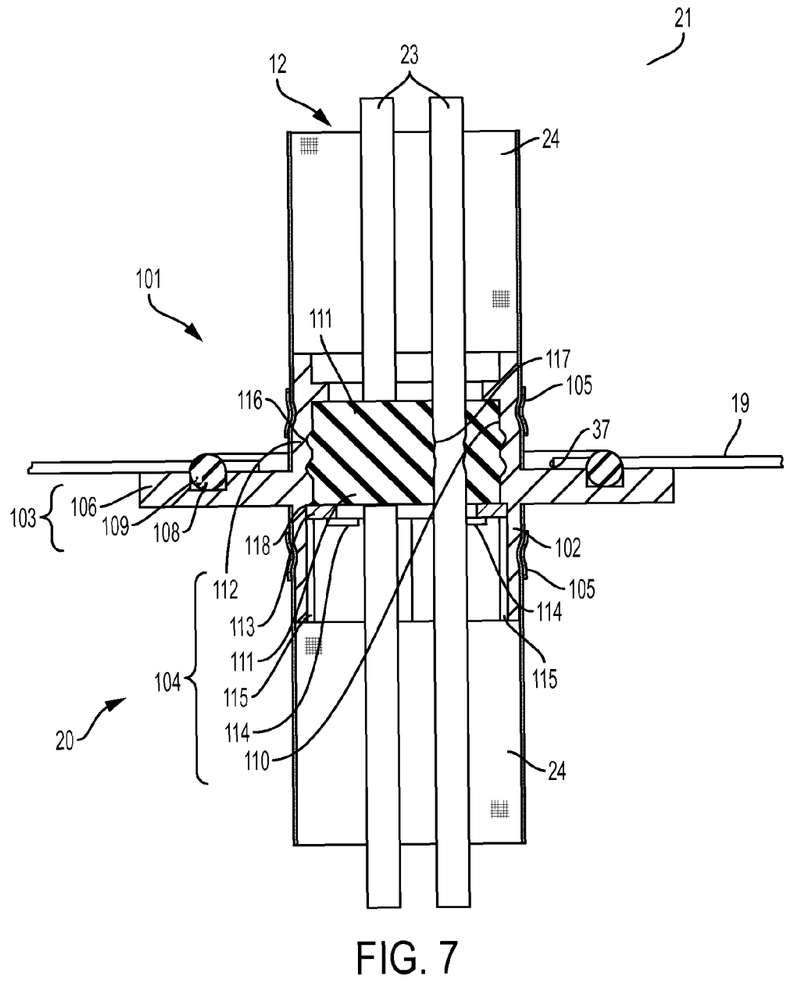
FIG. 7 is a sectional view taken along line B-B in FIG. 6.
Figure 8:
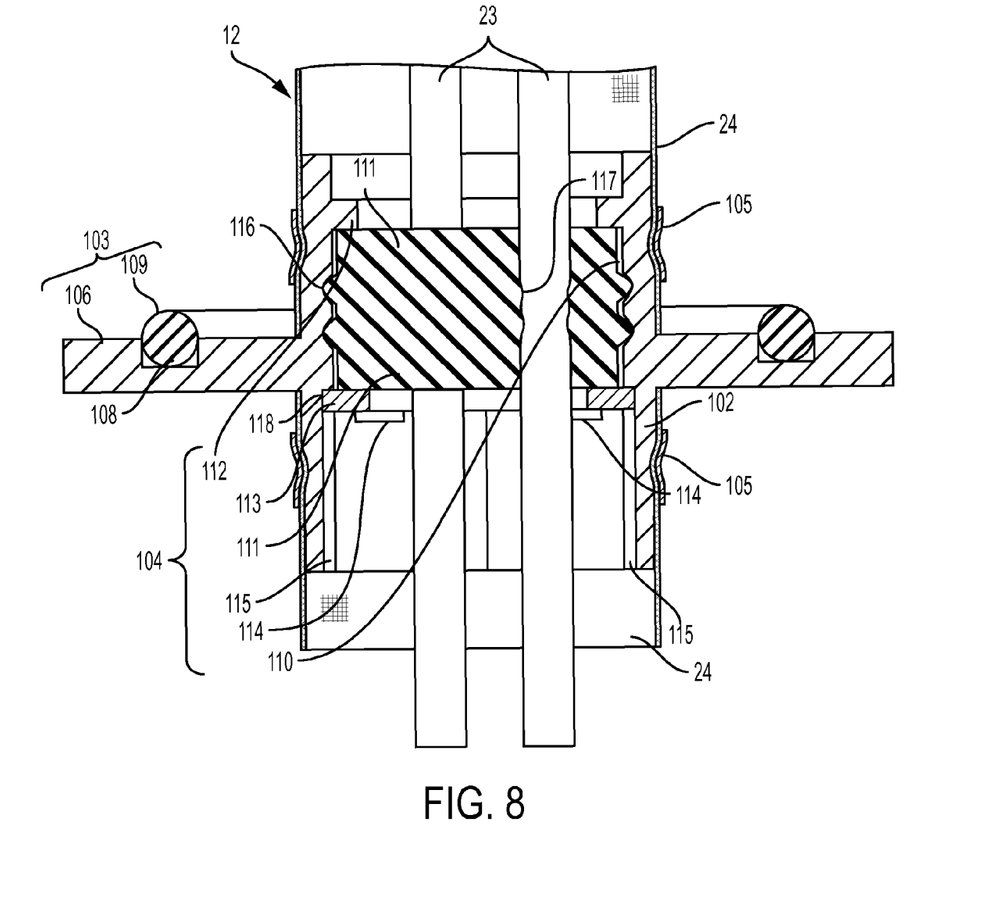
FIG. 8 is an enlarged view of main portions of FIG. 7.

Hereinafter, a water stop structure for a wire harness, and wire harness of Embodiment 3 of the invention will be described with reference to the drawings. FIG. 5 is a perspective view of the water stop structure for a wire harness, and wire harness of Embodiment 3 of the invention. FIG. 6 is a front view of the water stop structure for the wire harness shown in FIG. 5. FIG. 7 is a sectional view taken along line B-B in FIG. 6. FIG. 8 is an enlarged view of main portions of FIG. 7. The components which are identical with those of Embodiments 1 and 2 are denoted by the same reference numerals, and their detailed description is omitted.

In FIG. 5, the reference numeral 101 indicates a water stop structure (water stop structure for a wire harness) which attains similar effects as the water stop structures 22, 51 (see FIGS. 1 to 4) of Embodiment 1 and 2. The water stop structure 101 of Embodiment 3 is disposed on the wire harness 12 in conformity with the position of the penetration portion 20 (see FIG. 7) of the vehicle body floor 19.

Referring to FIGS. 5 to 8, the water stop structure 101 includes: a cylindrical shield shell 102 which is disposed in an intermediate portion of the electromagnetic shield member 24 in a longitudinal direction, an outer water stop mechanism 103 which is disposed on the side of the outer peripheral surface of the cylindrical shield shell 102, and an inner water stop mechanism 104 which is disposed on the side of the inner peripheral surface of the cylindrical shield shell 102. With respect to the wire harness 12, the illustration of the exterior members 25, 26 (see FIG. 1) will be omitted.

The cylindrical shield shell 102 is a member made of an electrically conductive metal, and formed into a cylindrical shape. The cylindrical shield shell 102 is formed as a member which can divide the intermediate portion of the electromagnetic shield member 24 in a longitudinal direction, and join together the divided portions. In Embodiment 3, when the intermediate divided portions of the electromagnetic shield member 24 are to be joined together, shield rings 105 are used.

In a specific example of using the shield rings 105, similarly with Embodiments 1 and 2, the intermediate divided portions of the electromagnetic shield member 24 are placed on an one-end outer peripheral surface and other-end outer peripheral surface of the cylindrical shield shell 102, respectively, and then the shield rings 105 are placed outside the intermediate divided portions. Thereafter, the shield rings 105 are crimped, thereby joining the intermediate divided portions of the electromagnetic shield member 24 to the cylindrical shield shell 102.

A flange-like metal shell 106 constituting the outer water stop mechanism 103 is projectingly formed on the intermediate outer peripheral surface of the cylindrical shield shell 102. The flange-like metal shell 106 is formed as an attaching portion which is integrated with the cylindrical shield shell 102.

Bolt passing holes 107 for bolting the structure to the vehicle body floor 19, and an annular groove 108 which is larger in diameter than the through hole 37 that penetrates the vehicle body floor 19 are formed in the flange-like metal shell 106. An O-ring 109 (seal member) which is interposed between the flange-like metal shell 106 and the vehicle body floor 19, and which is in watertight contact with them is disposed in the annular groove 108. The O-ring 109 is disposed as a member constituting the outer water stop mechanism 103. The member is not limited to the O-ring 109, and a known packing may be used as a seal member.

The outer water stop mechanism 103 is configured so that entering of water from the side of the outer peripheral surface of the cylindrical shield shell 102 into the cabin 21 can be prevented from occurring by disposing the flange-like metal shell 106 and the O-ring 109.

In contrast to the outer water stop mechanism 103 configured as described above, the inner water stop mechanism 104 is configured so that entering of water from the side of the inner peripheral surface of the cylindrical shield shell 102 can be prevented from occurring. Specifically, the inner water stop mechanism has: a seal portion 110 which is formed on the intermediate inner peripheral surface of the cylindrical shield shell 102, a water stop plug member 111 which is in watertight contact with the outer peripheral surfaces of the covers of the three high-voltage wires 23 passed through the cylindrical shield shell 102, and also with the seal portion 110, an annular flange portion 112 which locates and receives the water stop plug member 111, an annular slip-off preventing member 113 which prevents the water stop plug member 111 from slipping off, an engagement hole 114 which engages with the slip-off preventing member 113 to latch it, and a guiding groove 115, and is configured so that entering of water can be prevented from occurring.

The water stop plug member 111 is basically identical with the water stop plug member 39 (see FIG. 1) in Embodiment 1 and the water stop plug member 66 (see FIG. 4) in Embodiment 2, and an elastic rubber plug is used. The water stop plug member 111 has a shell-side seal portion 116 which is in watertight contact with the seal portion 110, and conducting path-side seal portions 117 which are formed while passing through the water stop plug member 111.

The shell-side seal portion 116 of the water stop plug member 111 is formed into a lip-like shape configured by a plurality of lip portions (not referenced).

In the water stop plug member 111, since the number of the high-voltage wires 23 is three, three conducting path-side seal portions 111 are formed (the portions are penetratingly formed in conformity with the number of the conducting paths). Similarly with the shell-side seal portion 116, the conducting path-side seal portions 117 are formed into a lip-like shape configured by a plurality of lip portions (not referenced).

The slip-off preventing member 113 is disposed as an annular component. A plurality of engagement claws (not shown), and one or plural guiding projections 118 are formed in the outer peripheral edge of the slip-off preventing member 113. The engagement claws are formed as a portion which engages with the engagement hole 114 to be latched. The guiding projections 118 are formed as a portion which is guided by the guiding groove 115 formed in the inner peripheral surface of the cylindrical shield shell 102. The portion between the outer and inner rims of the slip-off preventing member 113 is formed as a portion which presses the water stop plug member 111.

The annular flange portion 112, the slip-off preventing member 113, the engagement hole 114, and the guiding groove 115 correspond to the slip-off preventing mechanism in the embodiment.

In the above-described configuration and structure of Embodiment 3, the water stop structure 101 includes the cylindrical shield shell 102 which is disposed in an intermediate portion of the electromagnetic shield member 24 constituting the wire harness 12 in a longitudinal direction, the cylindrical shield shell 102 is made electrically conductive, and therefore the shielding function of the wire harness 12 is not impaired. As a result, the configuration attains an effect that, even when the water stop structure 101 is disposed, the shielding function can be sufficiently exerted.

Furthermore, the water stop structure 101 includes the outer water stop mechanism 103 and inner water stop mechanism 104 which are disposed on the sides of the outer and inner peripheral surfaces of the cylindrical shield shell 102. Because of the above-described configurations and structures of the outer water stop mechanism 103 and the inner water stop mechanism 104, an effect that water is surely stopped is attained. When water can be surely stopped, another effect that the necessity of an inspection for checking whether water stop is sufficiently performed or not can be eliminated is attained. Therefore, also a further effect that the necessity of a check inspection can be eliminated, and it is possible to suppress increase of the cost is attained.

Hereinafter, the features of the above-described embodiments of the water stop structure for a wire harness and wire harness of the invention are listed briefly and summarily in sections i to vii below.

[i] The water stop structure for a wire harness (water stop structure) 22, includes:
    a cylindrical shield shell 27 which is disposed at an intermediate portion of the shield member (electromagnetic shield member) 24 in a longitudinal direction, the shield member covering the one or plural conducting paths (high-voltage wires) 23, and which is made of an electrically conductive metal;
    an outer water stop mechanism 28 which is disposed on a side of the outer peripheral surface of the cylindrical shield shell 27; and
    an inner water stop mechanism 29 which is disposed on a side of the inner peripheral surface of the cylindrical shield shell 27,
    wherein the inner water stop mechanism 29 has the elastic water stop plug member 39, and,
    wherein a shell-side seal portion 40 which is in watertight contact with the inner peripheral surface of the cylindrical shield shell 27 and one or plural conducting path-side seal portions 41 which are in watertight contact with outer peripheral surfaces of covers of the conducting paths (high-voltage wires) 23 are formed on the water stop plug member 39, the one or plural conducting path-side seal portions being formed so as to pass through the water stop plug member 39.

[ii] The water stop structure for a wire harness (water stop structure) 51 according to [i] above, wherein the inner water stop mechanism 54 includes the slip-off preventing mechanism (the annular flange portion 67, the slip-off preventing member 68, the engagement hole 69, and the guiding groove 70) for preventing the water stop plug member 66 from slipping off the cylindrical shield shell 52.

[iii] The water stop structure for a wire harness (water stop structure) 22, 51 according to [i] or [ii] above, wherein the outer water stop mechanism 28, 53 includes a seal portion 31, 57 which is formed on the outer peripheral surface of the cylindrical shield shell 27, 52 and a grommet 32, 58 which is provided so as to be in watertight contact with the seal portion 31, 57.

[iv] The water stop structure for a wire harness (water stop structure) 101 according to [i] or [ii] above, wherein the outer water stop mechanism 103 includes a flange-like metal shell 106 which is formed projectingly from the outer peripheral surface of the cylindrical shield shell 102 and a seal member (O-ring) 109 which is provided so as to be in watertight contact with the flange-like metal 106 shell.

[v] The wire harness 12 wherein the water stop structure for the wire harness (water stop structure) 22, 51 according to [i] or [ii] above is disposed in the penetration portion 20 in the vehicle (hybrid automobile) 1.

[vi] The wire harness 12 wherein the water stop structure for the wire harness (water stop structure) 22, 51 according to [iii] above is disposed in the penetration portion 20 in the vehicle (hybrid automobile) 1.

[vii] The wire harness 12 wherein the water stop structure for the wire harness (water stop structure) 101 according to [iv] above is disposed in the penetration portion 20 in the vehicle (hybrid automobile) 1.

In addition, it is a matter of course that the invention can be variously implemented without changing the spirit of the invention.

According to the water stop structure for a wire harness, and wire harness based on the invention, the shielding function of the wire harness can be sufficiently exerted, and water can be surely stopped, thereby eliminating the necessity of a check inspection. When the necessity of an inspection for checking whether water is surely stopped or not is eliminated, it is possible to suppress increase of the cost.

What is claimed is:

1. A water stop structure for a wire harness comprising:
    a cylindrical shield shell which is disposed at an intermediate portion of a shield member in a longitudinal direction, the shield member covering one or plural conducting paths, and which is made of an electrically conductive metal;
    an outer water stop mechanism which is disposed on a side of an outer peripheral surface of the cylindrical shield shell; and
    an inner water stop mechanism which is disposed on a side of an inner peripheral surface of the cylindrical shield shell,
    wherein the inner water stop mechanism has an elastic water stop plug member; and
    wherein a shell-side seal portion which is in watertight contact with the inner peripheral surface of the cylindrical shield shell and one or plural conducting path-side seal portions which are in watertight contact with outer peripheral surfaces of covers of the conducting paths are formed on the water stop plug member, the one or plural conducting path-side seal portions being formed so as to pass through the water stop plug member.

2. The water stop structure for the wire harness according to claim 1, wherein the inner water stop mechanism includes a slip-off preventing mechanism which prevents the water stop plug member from slipping off the cylindrical shield shell.

3. The water stop structure for the wire harness according to claim 1, wherein the outer water stop mechanism includes a seal portion which is formed on the outer peripheral surface of the cylindrical shield shell and a grommet which is provided so as to be in watertight contact with the seal portion.

4. The water stop structure for the wire harness according to claim 1, wherein the outer water stop mechanism includes a flange-like metal shell which is formed projectingly from the outer peripheral surface of the cylindrical shield shell and a seal member which is provided so as to be in watertight contact with the flange-like metal shell.

5. A wire harness wherein the water stop structure for the wire harness according to claim 1 is disposed in a penetration portion in a vehicle.

* * * * *